United States Patent [19]

Swearingen

[11] Patent Number: 4,512,851

[45] Date of Patent: Apr. 23, 1985

[54] PROCESS OF PURIFYING A RECIRCULATING WORKING FLUID

[76] Inventor: Judson S. Swearingen, 2235 Carmelina Ave., Los Angeles, Calif. 90064

[21] Appl. No.: 466,430

[22] Filed: Feb. 15, 1983

[51] Int. Cl.³ .................... B01D 3/06; B01D 3/42; F01K 25/00; F01K 27/00

[52] U.S. Cl. .................................... 203/88; 203/1; 203/2; 203/94; 203/DIG. 7; 203/DIG. 20; 60/646; 60/641.5; 159/2.1

[58] Field of Search .......... 203/94, DIG. 7, DIG. 20, 203/1, 91, 98, 88, 2; 159/DIG. 39, DIG. 40; 60/646, 641.5, 657, 649

[56] References Cited

U.S. PATENT DOCUMENTS

| | | | |
|---|---|---|---|
| 3,338,053 | 8/1967 | Gorzegno et al. | 60/646 |
| 3,797,248 | 3/1974 | Witzel et al. | 60/646 |
| 4,005,580 | 2/1977 | Swearingen | 60/657 |
| 4,026,111 | 5/1977 | Matthews | 60/641.5 |
| 4,195,485 | 4/1980 | Brinkerhoff | 60/649 |
| 4,287,430 | 9/1981 | Guido | 60/646 |
| 4,333,313 | 6/1982 | Cardone et al. | 60/649 |
| 4,357,801 | 11/1982 | Wahl | 60/646 |
| 4,398,392 | 8/1983 | Ganic | 60/657 |

FOREIGN PATENT DOCUMENTS

| | | | |
|---|---|---|---|
| 471122 | of 1972 | Japan | 60/646 |
| 5652510 | 5/1981 | Japan | 60/657 |
| 400775 | 4/1974 | U.S.S.R. | 60/646 |

Primary Examiner—Wilbur Bascomb
Assistant Examiner—V. Manoharan
Attorney, Agent, or Firm—Lyon & Lyon

[57] ABSTRACT

This process separates less volatile contaminates from thermal power recovery systems utilizing a volatile working fluid in a cyclic closed system; such a system may comprise a reservoir, a pump, a heater, a separator, a throttle device, a turbine and a condenser. The purification can be accomplished during start-up, shut-down or periods of low power generation. The contaminant is separated from the working fluid in the separator in which the temperature and pressure correspond to a dew-point substantially above that of a sample of uncontaminated working fluid. To achieve this condition, the normal flow of liquid from the reservoir to the heater is reduced and the heater and throttle device are correspondingly adjusted. The condensed contaminant is removed from the separator while substantially all of the working fluid which has been vaporized is passed on through the throttle device to the turbine.

5 Claims, 1 Drawing Figure

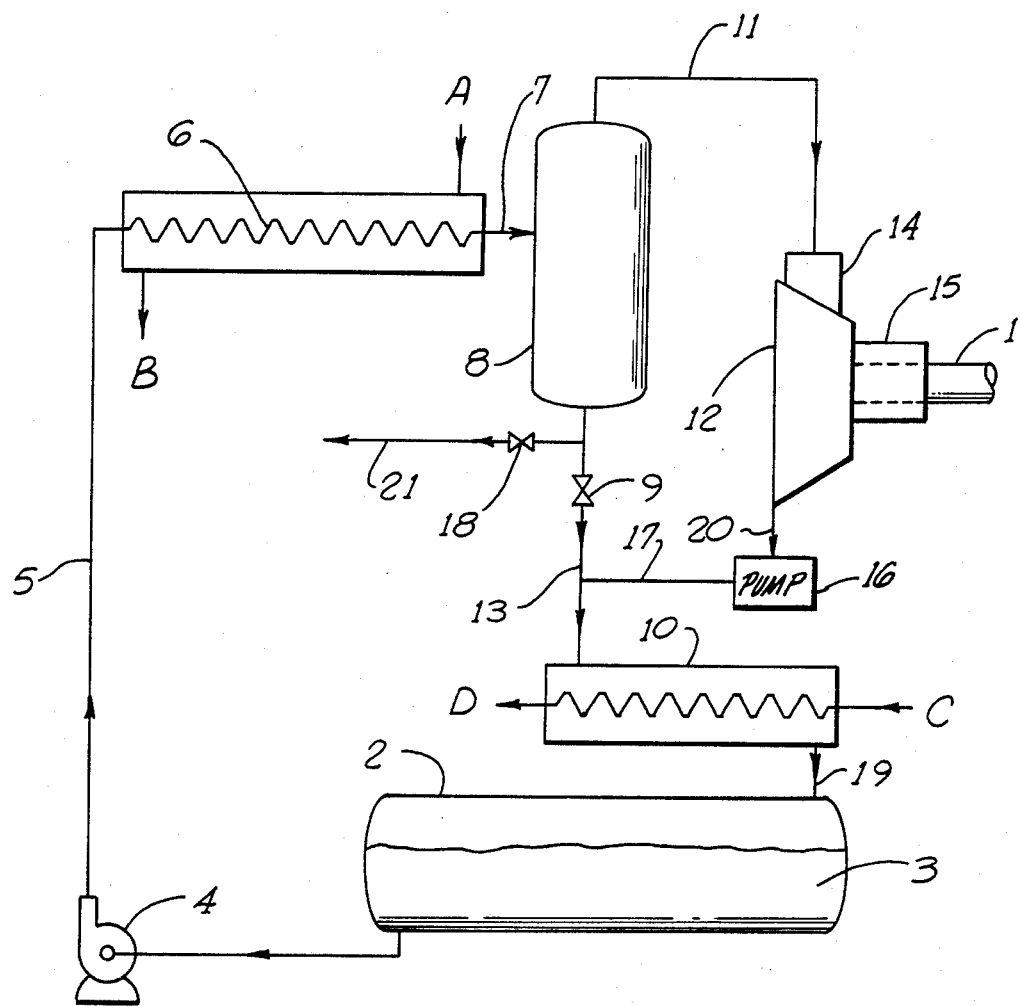

PROCESS OF PURIFYING A RECIRCULATING WORKING FLUID

BACKGROUND OF THE INVENTION

Mechanical power can be produced in a system in which heat at an elevated temperature from a heat source is introduced into the system and then rejected into a heat sink at a lower temperature. Thermal power recovery systems under normal operation typically utilize a volatile working fluid which is pumped in a liquid state under substantial pressure through a heat exchanger where heat from the heat source raises the temperature of the working fluid and substantially increases the volume of the working fluid. One common way to increase the volume of the working fluid is through vaporization. Once vaporized, the working fluid still under pressure is expanded after introduction into an expansion engine where the gas expansion may be utilized to produce mechanical power. The exhaust vapor leaving the expansion engine will then flow at a reduced pressure into a condenser where the heat is rejected to the heat sink and the vapor is condensed and returned to the pump where the process is once again repeated. Since the working fluid may be in a liquid state at one phase of circulation in the system while in a gaseous state at another phase of the system, the term "fluid" is used herein to designate a flowable medium, either gas or liquid.

In a commercial thermal power recovery system, a turbine is often used for the expansion engine. A turbine rotor can be supported on a rotating shaft, requiring a shaft seal to isolate and retain the working fluid within the turbine. Beyond the seal, conventionally, there are lubricated bearings such that the shaft seal also serves to keep the working fluid and the lubricant separate. Such sealing systems are normally not perfect. The working fluid may be contaminated with lubricant or sealing fluid, especially due to possible misoperation and the like. Besides the sealing system, the working fluid may also be contaminated from other possible sources, such as from deposits in newly installed equipment or from equipment repair. Commercial processes often have different means for dealing with the contamination of the working fluid, and in fact, some processes actually utilize the lubricating oil in the start-up of their processes.

During start-up of a thermal power recovery system, the working fluid is usually pumped through a heater in which only a limited portion of the working fluid is vaporized because the equipment has not yet warmed up to its normal operating temperature. The portion of the working fluid which is not vaporized is returned to a reservoir from which it is once again pumped to the heater. The vaporized portion of the working fluid passes through the recirculation system and may in fact generate a limited amount of power. As the equipment becomes warmer and the temperature is raised higher, the vapor pressure increases and less and less liquid is left unvaporized to be returned to the reservoir while more and more vapor is passed through the recirculation system until full-power is reached. Under normal operation, the time typically required to safely warm up such a system is usually on the order of one half hour.

It is known that shaft lubrication oil and the working fluid may be combined together during start up. An example of one such application is found in U.S. Pat. No. 3,797,248 to Wetzel et al. Such a thermal power recovery system will employ additional special equipment in order to separate the working fluid and the lubricating fluid before the system is run at full scale. In the Wetzel et al. patent, after the fluids are mixed during start-up, a distillation step and a gravity or screen separator are utilized to remove the lubricant from the working fluid.

Other thermal power recovery systems keep the working fluid and the lubricating fluid completely separated. In a prior patent of mine, U.S. Pat. No. 4,005,580, a seal system is disclosed wherein the working fluid is sealed from escape along the shaft. In another patent, U.S. Pat. No. 3,831,381, a lubricating and sealing system for a rotary shaft utilized in a power plant is described. The disclosure of both of these patents are hereby specifically incorporated by reference.

SUMMARY OF THE INVENTION

The present invention is a process for purifying a process recirculating fluid in a thermal power recovery system with a feed pump, a heater, a separator, a flow control device, a turbine, a condenser, and a reservoir. Since this invention is particularly designed for use in a system with only a modest or minor degree of contamination of working fluid, with a contaminant of lower volatility than the working fluid, separation of the contaminant from the working fluid may be accomplished during a period of low-powder operation, such as start-up or shut-down. There is no need for continual purification. The lubricant in this invention need not be miscible with the working fluid. The contaminant will be separated in the separating means after vaporization by the heating zone of the heater. After a contaminant is separated from the working fluid, it is removed from the recirculation system and is not returned to the lubricating fluid. If desired, additional equipment could be added to purify any lubricating fluid in the contaminant so that the lubricating fluid could then be returned to the system.

Because the contaminant is removed during a limited period of low-power operation when the working fluid is being pumped at a separation flow rate which is less than a normal operational flow rate, no additional energy will be required in order to effect removal. In addition, if the removal is accomplished during start-up, the purification process will save energy because substantially all of the working fluid pumped from the reservoir will be vaporized and utilized to warm-up the expansion engine, thereby eliminating present inefficiency caused by returning unvaporized working fluid to the reservoir.

The purification of this invention is achieved by reducing the flow of working fluid into the heater while adjusting the flow of the vaporized working fluid into the turbine so as to vaporize substantially all of the working fluid leaving the separator while the contaminant is passed off from the separator in its liquid state. During this purification, separating conditions are maintained such that the working fluid is vaporized at a temperature and a pressure which correspond to a temperature dew-point substantially above that of a sample of uncontaminated working fluid. Since the separation need not be conducted during normal operating conditions where the temperature and pressure are usually near the critical point of working fluid, which might make separation impossible, separation is more efficient and easier to achieve because near critical operating conditions can be avoided. Thus, the present invention can process large quantities of liquid in a short length of time without additional equipment. Further, separation can be made as sharp as necessary by adjusting the temperature and pressure at which separation occurs, and since the separator is more efficient at a lower flow rate, a smaller size separator may be used, which results in a cost savings.

The process of this invention is equally applicable to a heat pump system since the temperature of the equipment in such a system may be adjusted during start-up and there is also a low pressure vaporization opportunity in the heat up system.

BRIEF DESCRIPTION OF THE DRAWINGS

The drawing is a schematic illustration of an embodiment of the process of this invention.

DESCRIPTION OF THE PREFERRED EMBODIMENT

In accordance with the process of this invention, reservoir 2 contains a certain volume of working fluid 3 from which pump 4 draws liquid and pumps it under substantial pressure through conduit 5 through heater 6 where its temperature is substantially elevated by heat from stream A-B and vaporized. This vapor stream is transferred through conduit 7 into separator 8 where any portion that may not have been vaporized will collect and be returned through valve 9, conduit 13, condenser 10, and conduit 19 into reservoir 2. The vaporized portion of the heated fluid in conduit 7 is separated in separator 8 and delivered by conduit 11 into turbine 12 through a flow control device 14. The flow control device can be any one of a number of devices including a valve or variable primary nozzles. Once the vaporized portion of the heating fluid is in turbine 12, it expands and produces power, transmitted by shaft 1, and the resulting expanded vapor flows through conduits 20, 17 and 13 into condenser 10 where it is condensed and delivered through conduit 19 into reservoir 2, and the process is then repeated.

The shaft 1 of turbine 12 has a seal 15 to retain the working fluid and to prevent working fluid contamination by shaft bearing lubricant. Since sealing systems are generally not completely infallible, a small stream comprising a mixture of lubricant and working fluid may be produced. This mixture is ordinarily saved and separated, the constituents being returned to their respective systems. The recovered working fluid is compressed by pump 16 and pumped through conduit 17 into the conduit 13 to rejoin the main body of working fluid.

When the present invention is utilized to purify the recirculated working fluid, the flow of pump 4 preferably is reduced and by adjustment of flow control device 14, the pressure of separator 8 will be adjusted. Valve 9 is left closed during purification while valve 18 is opened to remove the contaminated liquid which accumulates in separator 8 through conduit 21.

The present invention is primarily concerned with the removal of lubricating oil or sealing fluid which has contaminated the working fluid. The thermal power recovery system of the present invention has a separate lubricant inventory which is not mixed with the working fluid. Additionally, the present invention is not concerned with dealing with contaminated lube oil and such oil is not returned to the lubricant inventory, except as described above.

What is claimed:

1. A process for removing a less volatile minor contaminant from a volatile recirculating working fluid in a thermal power recovery system in which a pump draws the working fluid from a reservoir and pumps the working fluid under pressure through a heating means to vaporize the working fluid which then flows to a separating means where a portion of the working fluid not vaporized is collected and returned to the reservoir while the vaporized working fluid is delivered through a flow control device to an expansion engine where the working fluid expands and produces power which is transmitted to a shaft, the shaft having a seal to prevent contamination of the working fluid by a shaft contaminant, the resulting expanded vaporized working fluid flowing to a condenser where it is condensed and returned to the reservoir, the improvement comprising the steps of:
    (a) reducing the rate at which a working fluid containing the contaminant is drawn from the reservoir; and
    (b) adjusting the flow control device to reduce the pressure in the separating means, so that substantially all of the working fluid being vaporized in the heating means at a temperature and a pressure corresponding to a temperature/pressure dew-point substantially above that of a sample of uncontaminated working fluid to form a vaporized working fluid and a residual unvaporized contaminant;
    (c) collecting the residual unvaporized contaminant from the vaporized working fluid in the separating means;
    (d) passing the vaporized working fluid through the flow control device; and
    (e) removing the residual unvaporized contaminant from the separating means.

2. A process for removing a contaminant from a working fluid in a thermal power recovery system during a period of non-peak operation, the contaminant being less volatile than the working fluid, comprising the steps of:
    (a) pumping a working fluid containing the contaminant from a reservoir to a heating means at a separating flow rate, the separating flow rate being less than a normal operational flow rate;
    (b) vaporizing substantially all of the working fluid in the heating means to form a vaporized working fluid and a residual unvaporized contaminant;
    (c) passing the vaporized working fluid and the residual unvaporized contaminant from the heating means to the separating means;
    (d) separating the residual unvaporized contaminant from the vaporized working fluid in the separating means, substantially all of the vaporized working fluid passing from said separating means to a flow control device in a gaseous state, the residual unvaporized contaminant passing from said separating means to a system exit in a liquid state; and
    (e) maintaining separating conditions in the separating means by adjusting the flow control means and the separating flow rate to keep the separating conditions at a temperature and a pressure corresponding to a temperature/pressure dew-point which is substantially above that of a sample of uncontaminated working fluid.

3. A process for removing a contaminant from a volatile recirculating working fluid during start-up of a thermal power recovery system, the contaminant being less volatile than the working fluid, comprising the steps of:

(a) pumping the working fluid and the contaminant from a reservoir to a heating means at an initial pumping rate;

(b) vaporizing the working fluid to form a vaporized working fluid and a residual unvaporized contaminant which are passed to a separating means;

(c) separating the vaporized working fluid from the residual unvaporized contaminant at a temperature and a pressure corresponding to a temperature/pressure dew-point substantially above that of a sample of uncontaminated working fluid, the residual unvaporized contaminant being collected in the separating means in a liquid state;

(d) passing the vaporized working fluid from the separating means through a flow control device to a power generating means from which the vaporized working fluid passes to return to the reservoir;

(e) passing the residual unvaporized contaminant from the separating means to an exit means;

(f) adjusting the flow control device to control the temperature of the heating means to maintain a separating condition in the separating means during start-up of the system;

(g) increasing the pumping rate to operating conditions; and (h) adjusting the flow control device and the temperature of the heating means to achieve an operational pressure and temperature in the separator means.

4. A process as defined in claim 3, further comprising the following steps between step (g) and step (h);

closing the exit means;

opening a return means through which liquid working fluid may pass from the separating means to the reservoir.

5. A process for removing a contaminant from a working fluid in a thermal power recovery system during shut-down of the system, the contaminant being less volatile than the working fluid, comprising the steps of:

(a) reducing the flow rate of the working fluid and the contaminant from a reservoir to a heating means;

(b) adjusting a flow control device for vaporized working fluid leaving a separating means to reduce the pressure in the separating means, the temperature and pressure of the separating means corresponding to a temperature/pressure dew-point substantially above that of a sample of uncontaminated working fluid;

(c) vaporizing substantially all of the working fluid entering the heating means from the reservoir to form a vaporized working fluid and a residual unvaporized contaminant;

(d) passing the vaporized working fluid and the residual unvaporized contaminant into the separating means; and (e) separating the residual unvaporized contaminant from the vaporized working fluid in the separating means, the residual unvaporized contaminant passing from the separating means to a system exit in a liquid state, the vaporized working fluid passing from the separating means to the flow control device in a vapor state.

* * * * *